July 30, 1957 H. C. HUBBARD 2,801,339

OSCILLATOR

Filed March 31, 1954

INVENTOR

Harold C. Hubbard

BY James B. Vander Velde

ATTORNEY 2,801,339

OSCILLATOR

Harold C. Hubbard, Lansing, Mich.

Application March 31, 1954, Serial No. 420,046
9 Claims. (Cl. 250—36)

The present invention relates to a frequency stable, simply-constructed oscillator and more particularly to an oscillator capable of delivering frequencies between 25 and at least 2 megacycles per second, which can be employed in electronic circuits wherever present-day conventional oscillators are used.

Heretofore, oscillator circuits have been complex because frequency control, reflecting the quality of the oscillator, was dependent upon a stable power supply. As a consequence, if the cycle variation was held within one percent, the oscillator was commercially satisfactory. Even oscillators for use in organs required an accuracy of only one-fourth of one percent. Stable frequency control of oscillators was accomplished in prior art methods by a complex power supply system involving the use of transformers, rectifiers, filter condensers, filter chokes, bleeder resistors, voltage regulators and other associated apparatus in an effort to stabilize the power supply with the result that frequency drift or fluctuations might be held to a minimum.

Oscillators built in accordance with the present description have a frequency stability heretofore thought unattainable and require no conventional stabilized power supply. Since no B plate supply is necessary, fluctuations therein have no effect on the frequency stability of the oscillator of the present invention. While such instruments as organs, television equipment, recording apparatus, et cetera, using conventional oscillators are obvious recipients of the advantages accruing from the oscillator of the present invention, this description is not intended to be a complete catalog of all practical applications, and it is contemplated that wherever oscillators are employed, the device of the present invention will prove beneficial from many standpoints.

Accordingly, it is one of the objects of this invention to produce a frequency stable oscillator which is substantially independent of the power supply in the conventional sense of power supply.

It is another object of the present invention to provide an oscillator circuit having a minimum number of structural components.

It is another object to provide an oscillator wherein the oscillations are accomplished without conventional power supply and consequently, which require substantially no power supply regulation.

A further object of the present invention is to provide a frequency oscillator which is stable, simple and which has a decaying stopping time, if desired.

Still another object of the present invention is to provide an oscillator whose frequency is substantially independent of the grid capacitance and resistance.

Other objects of the present invention will become apparent to those skilled in the art.

*General description*

Figure 1:
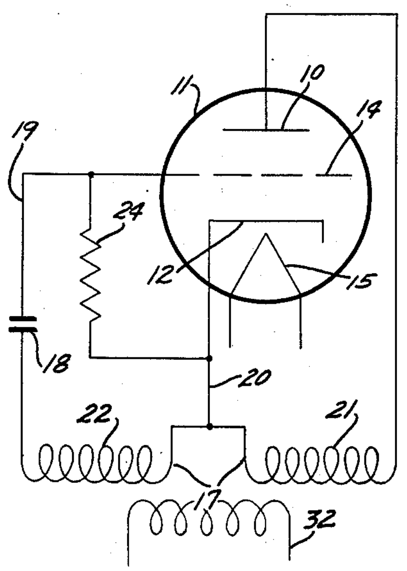
Figure 1 represents the basic triode circuit of the present invention.

Previously, it has been indicated that an oscillator's frequency stability is dependent upon a stable power supply. Conventional oscillators bear this out by requiring an ample rectified power supply obtained through voltage regulating transformers or voltage regulator tubes in order to accomplish stabilization of power and consequent frequency stability. Without such precautions in the way of power controls, a satisfactory oscillator has been previously thought impossible.

Electron emission from a heated cathode has long been known and the present oscillator apparently utilizes the electron emission therefrom to energize the oscillator. Thus, by providing an electron emitter and emission therefrom, there is provided a pressure or space charge of electrons which may be utilized by the circuit to produce stable oscillations. Any electron emitting source may be used, although as a matter of present convenience, an emitter of the cathode type heated by an electrically-insulated filament, and suitable to any conventional electrical power source of alternating or direct current is herein described. In such cases, because of residual heat phenomena and because such emitters are operated at a temperature beyond which a peak emission is obtained, power variations sufficient to affect the characteristics of the electron emission rate are rare.

A tube having at least an electron emitter, a grid, and a plate or anode is employed. For example, the tubes obtainable as 117–L7, 6V6, 6K6, 42, 43, 6L6, 6F5, 6C5, 2A5, et cetera, have proved operationally successful. A heater insertable in the electron emitter is standard and is connected to a convenient power source, normally alternating or direct current.

Pentode tubes used as triodes, have been employed with excellent results, and tubes containing more elements will result in equally good performance in accord with the present invention, if used as triodes. It will also be appreciated by those skilled in the art that radioactive and light sensitive, as well as heat sensitive, emitters are comprehended within the scope of this description. Where a higher voltage is desired in the circuit, tubes containing two or more cathodes or emitters in series, and providing a cascading of electrons to provide the space charge may be used with good results. An example of this type of tube is the 117–L7.

Upon provision of an electron emitter, a grid and a plate or anode, a lead is run from the plate or anode and connected to an inductance coil. From the opposite side of the inductance coil a lead is run to one side of a capacitor and the other side of the capacitor is connected with the grid. A lead from the cathode is attached to the inductance between the anode lead and the lead to the capacitance. Resistance is bridged between the lead from the grid and any other place in the oscillator circuit on the opposite side of the capacitance. These oscillations may be impressed in any suitable manner, for example, by an inductance upon a work circuit, whereby the oscillations may be employed for any of the well-known uses of an alternating current.

*Specific description*

An electron tube 11 is employed having at least an anode 10, an electron emitter or cathode 12, a grid 14, and a resistance heating element 15 insulated from the cathode 12. In this connection, it will be understood that the emitter 12 may be of the photosensitive or radioactive type although the simplest illustration demonstrating a stable oscillator is that having a heater 15 energized either from an alternating or direct current source. As the heater 15 warms the cathode or emitter 12, a space charge of electrons 16 (schematically shown in Figure 4) surrounds the cathode or emitter 12.

Referring now to the circuitry presented in the simplest form, as in Figure 1, an inductance coil 17 is connected between the anode 10 and the grid 14 having a capacitor 18 positioned in the grid lead 19. The emitter lead 20 runs from the cathode or emitter 12 and is variably positionable on the inductance 17. A resistance 24 is bridged between the grid portion 19 of the grid-inductance lead 19 and the cathode-inductance lead 20.

Figure 2:
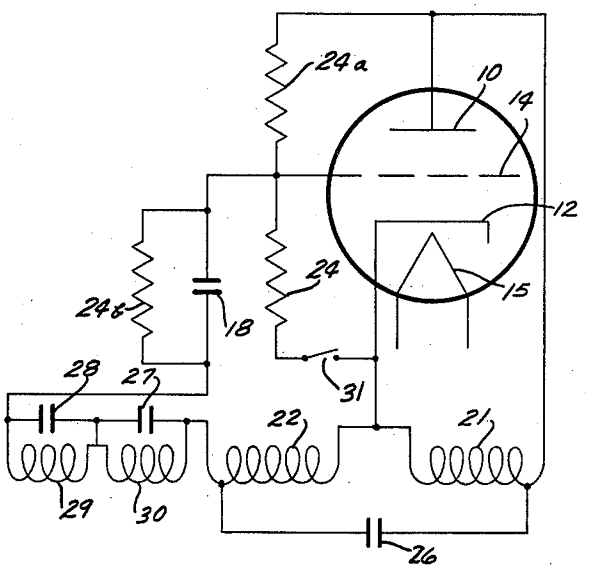
Figure 2 represents certain modifications of the basic circuit of Figure 1.

With regard to the positioning of the resistance, it will be understood that several positions are operatively possible and yield comparable oscillation results. Thus, a resistance lead attached to the grid lead 19 between the grid 14 and the capacitance 18 and connected to any other part of the circuit on the opposite side of the capacitance 18 is satisfactory. In this connection, see Figure 2 for the circuit so modified with resistances **24*a* and 24*b***.

Figure 3:
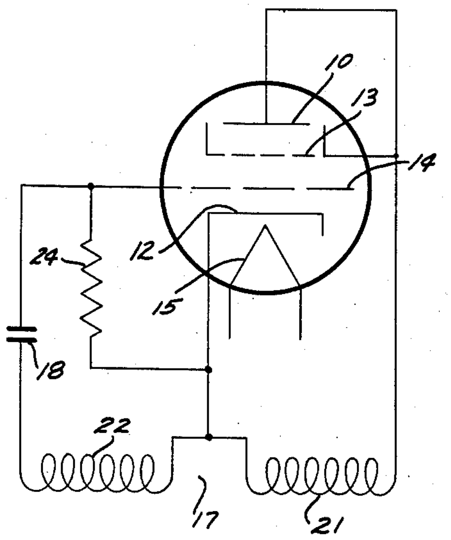
Figure 3 represents the basic circuit of the present invention utilizing a beam power tetrode rather than a triode.

When a tube other than a triode is employed, it is connected within the circuit in the same manner as is the triode. Thus, Figure 3 shows a schematic diagram of the circuit of the present invention utilizing a beam power tetrode tube. The circuit is connected the same as is the circuit utilizing a triode tube, except that the screen grid 13 is connected to the anode lead. The rest of the circuit is exactly the same as when a triode is employed.

The oscillations may be impressed on an inductance, as shown in Figure 1, which illustrates a specific means, inductance 32 serves as a part of the work circuit utilizing the oscillations.

*Theoretical explanation*

Figure 4:
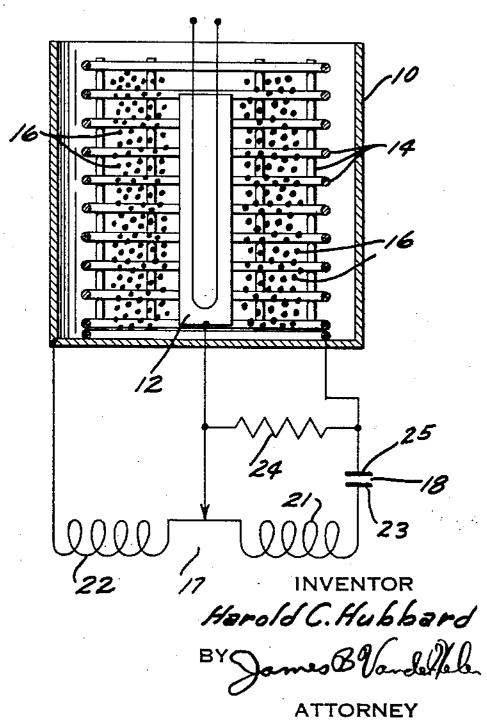
Figure 4 is a schematic diagram of the operation of the circuit of the present invention showing the electron emission within the tube.

While the theoretical operation of this circuit is not to be a limiting factor in the interpretation of the scope of the present invention, it is believed at the present time that the operation may be explained as follows, following Figure 4: The cathode 12 creates a space cloud 16 which migrates from the cathode 12. This causes the cathode 12 to become positive by the amount of electrons that are lost. This positive charge is placed on plate 23 of the capacitance 18, causing plate 25 to assume a negative charge of equal potential. This positive charge is also placed on anode 10. The space cloud 16 cannot move through the grid 14 to the plate 10. Thus, a certain pressure equilibrium as regards the space cloud between the cathode 12 and grid 14 will be built up. The negative charge of plate 25 of capacitance 18 tends to discharge through resistance 24 and through grid inductance 21, to plate 23.

This discharge creates a counter-electromotive force in grid inductance 21 and this C. E. M. F. tends to place a negative charge on plate 23 of the capacitance 18, causing a positive potential on plate 25. The same C. E. M. F. creates a positive charge on the anode end of plate inductance 22 in addition to the positive potential placed there by cathode 12. The grid 14 is now at a different potential and the anode 10 is relatively more positive which upsets the pressure equilibrium causing the space cloud to migrate past the grid and to the anode 10. This migration causes dissipation of the space cloud pressure. The electrons on anode 10 as a result of the space cloud pressure dissipation flow through plate coil 22 to cathode 12. This flow through plate coil 22 creates a C. E. M. F. which places a positive potential on plate 23. This causes plate 25 to be negative and places a negative potential to be added to the positive potential on anode 10. Thus, a cycle has been completed.

*General discussion*

Tuning of this oscillator is accomplished by a capacitor 26 across inductance 17, or by a capacitor across either inductance 21 or inductance 22 or by varying the core in any of these inductances. It will be understood that the frequency rate will also be dependent upon the particular inductance 17, 21 and 22 selected. In contrast to prior art oscillators, the capacitance 18 and resistance 24 have little effect on the frequency, but will affect the amplitude. Tuning may also be readily accomplished to varying frequencies by providing a series of additional inductances, illustrated in Figure 2 as capacitance 27 and 28 and inductance 29 and 30. With appropriate keying arrangements, it is possible to utilize the same oscillator basic circuit to provide varying frequencies.

Unexpectedly, when inductances 21 and 22 are of approximately equal magnitude, the oscillator will produce sine waves at any frequency that it is operated. This is accomplished, surprisingly, with no measurable harmonics, and, in view of the high degree of oscillator stability, offers many advantages. Additionally, it is possible to cause the oscillator to produce almost any desired waveform by adding inductances to grid coil 22. This includes odd and even harmonics as well as a combination thereof.

If the output circuit draws too much power, oscillation will be stopped, and as is usual in parallel resonant circuits, the circulating current inside the resonating circuits is many times the tube current or space charge. Therefore, the stopping point caused by the amount of power being taken off will be many times the tube current and less than that which is required for most common uses. The output power available, however, is sufficient to drive a set of headphones directly with ample volume.

Also, unexpectedly, by inserting a key 31 between grid resistor 24 and cathode 12, it is possible to cause a cessation of oscillation at a rate of decay such that there is an elimination of key click rather than an abrupt stoppage of electron flow. The rate of decay in such circuit is dependent on the value of the capacitance 18 and can be varied over a wide range. There is a direct relationship between the frequency, the rate of decay, and the microfarad value of the capacitance. Thus, to maintain the same rate of decay with different frequencies, a varying value of capacitance must be employed. Further, a key 31 may be used wherever the resistor is located in all of previously described positions, as, adjacent resistor **24*a* or resistor 24*b***. However, if a key is located other than in resistance adjacent positions above-described, but on the tube leads other than the filament leads, there will be an instantaneous stoppage of oscillations, rather than a decay.

Inasmuch as there are various modifications possible in the present invention which will be apparent to those skilled in the art, it is to be understood that I limit myself only as defined in the appended claims.

I claim:

1. An oscillator for operation without use of a source of voltage between an emitter and an anode which comprises a tube including an electron emitter, an anode, and a grid; means for causing said emitter to emit electrons, said means being electrically unconnected to both the emitter and the anode; a resistor, a capacitor and an inductor, said inductor being connected between the anode and the capacitor and the capacitor being connected between the inductor and the grid to furnish a grid-anode circuit, said resistor being connected between the grid side of the capacitor and a portion of said grid-anode circuit on the opposite side of the capacitor, and said emitter being connected to the inductor between its connections to the anode and the capacitor.

2. The apparatus of claim 1 in which said tube is a vacuum tube, said electron emitter is an indirectly heated cathode, and said means for causing said emitter to emit electrons is a heater adapted to be connected to a source of heater voltage, there being no connection between the heater source and both the anode and cathode.

3. The apparatus of claim 2 including a key, and in which said resistor is connected to said cathode through said key.

4. The apparatus of claim 1 including a second resistor connected between said anode and said grid.

5. An oscillator for operation without use of a source of voltage between an emitter and an anode which comprises a vacuum tube including an indirectly-heated cathode, a grid, an anode, and a heater adapted to be connected to a source of heater voltage and operable to cause said cathode to emit electrons toward the grid and anode, there being no connection between the heater source and both the anode and cathode, a resistor, a first capacitor, a second capacitor, and an inductor, said inductor being connected between the anode and said first capacitor and said first capacitor being connected between the inductor and the grid to furnish a grid-anode circuit, said resistor being connected between the grid side of the first capacitor and a portion of said grid-anode circuit on the opposite side of the first capacitor, said cathode being connected to the inductor between its connections to the anode and the first capacitor, and said second capacitor being connected across at least a portion of said inductor.

6. The apparatus of claim 5 including a plurality of other inductors, and a plurality of other capacitors each connected across one of the plurality of inductors, said plurality of other inductors being connected between said first-mentioned inductor and said first capacitor.

7. A frequency-stable oscillator for operation without an anode-cathode voltage supply which comprises a vacuum tube including an indirectly-heated cathode, a grid, an anode, and a heater adapted to be connected to a source of heater voltage and operable to cause the cathode to emit electrons toward the grid and anode, said heater being electrically insulated from the cathode and anode so that the heater source does not provide a potential difference between the anode and the cathode; an inductor, a capicitor and a resistor, said inductor being connected between the anode and the capacitor, said capacitor being connected between the inductor and the grid, said resistor being connected between the grid side and the inductor side of the capacitor, and said cathode being connected to said inductor between its connections to the anode and the capacitor.

8. The apparatus of claim 7 including means for tuning the inductor.

9. The apparatus of claim 8 including a key connected between the grid and cathode operable when closed to permit the oscillator to furnish oscillatory energy across said inductor and operable when opened to stop oscillations.

References Cited in the file of this patent

UNITED STATES PATENTS

| | | |
|---|---|---|
| 1,365,576 | White | Jan. 11, 1921 |
| 2,003,992 | Cockrell | June 14, 1935 |
| 2,243,071 | Crago | May 27, 1941 |
| 2,333,119 | Packard | Nov. 2, 1943 |